(12) United States Patent
Richardson

(10) Patent No.: US 7,546,975 B2
(45) Date of Patent: Jun. 16, 2009

(54) TANDEM ROTOR WING ROTATIONAL POSITION CONTROL SYSTEM

(75) Inventor: Steven D. Richardson, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 446 days.

(21) Appl. No.: 10/711,372

(22) Filed: Sep. 14, 2004

(65) Prior Publication Data

US 2006/0054737 A1 Mar. 16, 2006

(51) Int. Cl.
*G05D 1/00* (2006.01)
*B64C 27/54* (2006.01)

(52) U.S. Cl. ............... 244/17.13; 244/195; 244/12.3; 244/6; 244/17.23; 244/207

(58) Field of Classification Search ............ 244/17.11, 244/17.13, 17.23, 17.25, 6, 75.1–96; 416/60, 416/33, 34, 44, 130; 356/614
See application file for complete search history.

(56) References Cited

U.S. PATENT DOCUMENTS

| | | | | |
|---|---|---|---|---|
| 2,964,849 A | * | 12/1960 | Roccati | 356/25 |
| 3,515,485 A | * | 6/1970 | Frank | 356/141.2 |
| 3,524,354 A | * | 8/1970 | Frank et al. | 73/455 |
| 3,636,364 A | | 1/1972 | Stempler et al. | |
| 3,856,410 A | * | 12/1974 | Swift et al. | 356/398 |
| 3,905,565 A | | 9/1975 | Kolwey | |
| 4,004,756 A | * | 1/1977 | Gerstine et al. | 244/17.13 |
| 4,465,367 A | * | 8/1984 | Sabatier | 356/23 |
| 4,488,236 A | * | 12/1984 | Morrison et al. | 701/123 |
| 4,564,908 A | * | 1/1986 | Clelford et al. | 701/8 |
| 4,628,455 A | * | 12/1986 | Skutecki | 701/7 |
| 4,887,087 A | * | 12/1989 | Clearwater | 342/61 |
| 5,195,700 A | * | 3/1993 | Fogler et al. | 244/17.21 |
| 5,205,710 A | * | 4/1993 | Engels et al. | 416/61 |
| 5,229,956 A | * | 7/1993 | Daniell et al. | 702/175 |
| 5,294,075 A | * | 3/1994 | Vertatschitsch et al. | 244/1 R |
| 5,352,090 A | * | 10/1994 | Churchill et al. | 416/61 |
| 5,467,942 A | * | 11/1995 | Abbas et al. | 244/1 R |
| 5,671,051 A | * | 9/1997 | Wright, Jr. | 356/614 |
| 5,951,608 A | * | 9/1999 | Osder | 701/11 |

(Continued)

FOREIGN PATENT DOCUMENTS

GB 980608 A 1/1965

(Continued)

OTHER PUBLICATIONS http://mw1.merriam-webster.com/dictionary/indicative, Indicative, webster.*

*Primary Examiner*—Michael R Mansen
*Assistant Examiner*—Joshua J Michener
(74) *Attorney, Agent, or Firm*—Ostrager Chong Flaherty & Broitman P.C.

(57) ABSTRACT

A rotational position-adjusting system (6) for a vertical take-off and landing aircraft (4). The system (6) includes multiple detectors (60) that generate rotor signals. The rotor signals are indicative of the position of each rotor (8) of the aircraft (4). The rotors (8) provide lift to the aircraft (4). A controller (24) is coupled to the detectors (60) and adjusts the rotational speed of one or more of the rotors (8) in response to the rotor signals.

23 Claims, 2 Drawing Sheets

U.S. PATENT DOCUMENTS

| | | | |
|---|---|---|---|
| 6,322,324 B1 * | 11/2001 | Kennedy et al. | 416/1 |
| 6,448,924 B1 * | 9/2002 | Hafer, Jr. | 342/28 |
| 6,789,764 B2 * | 9/2004 | Bass et al. | 244/10 |
| 2002/0022909 A1 * | 2/2002 | Karem | 701/3 |
| 2006/0102777 A1 * | 5/2006 | Rock | 244/17.25 |

FOREIGN PATENT DOCUMENTS

| | | | |
|---|---|---|---|
| GB | 2213931 A | * | 8/1989 |

* cited by examiner

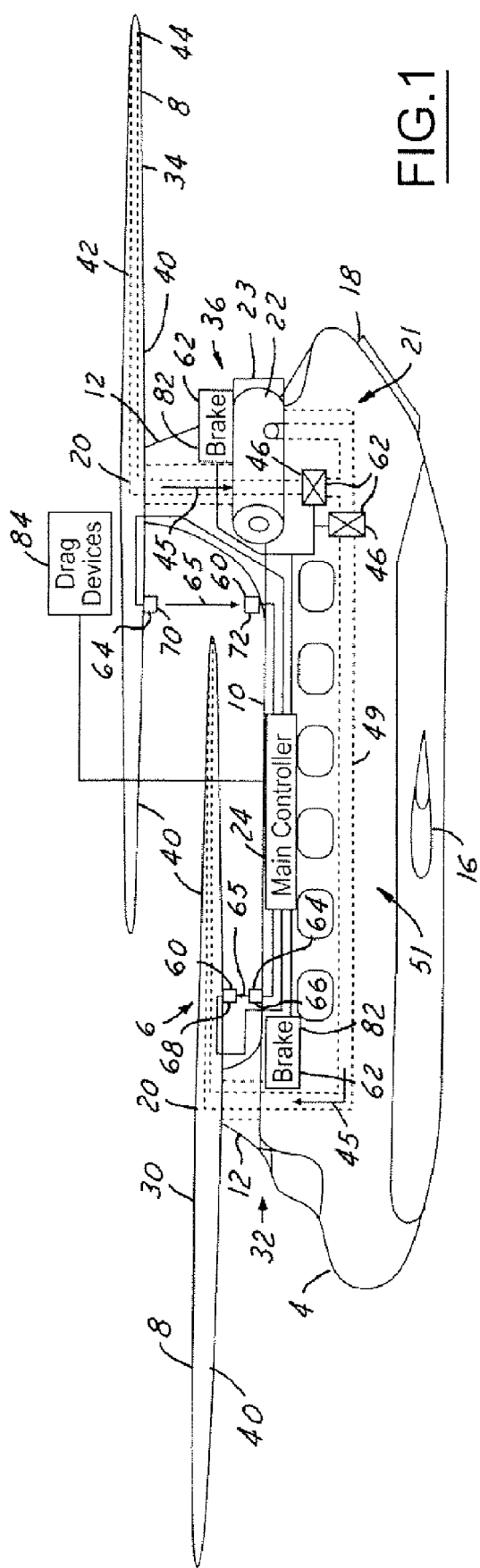
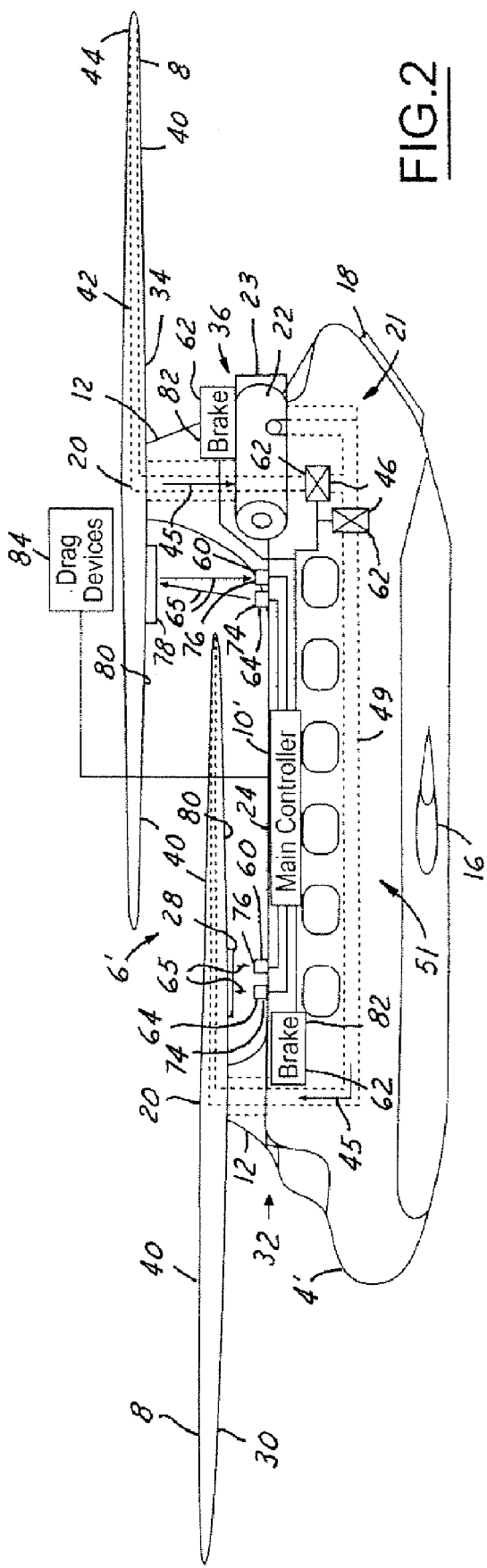

TANDEM ROTOR WING ROTATIONAL POSITION CONTROL SYSTEM

TECHNICAL FIELD

The present invention relates generally to aeronautical vehicle systems, and more particularly, to a method and system for controlling the rotational position of tandem rotor wings and dual or overlapping rotors of an aircraft.

BACKGROUND OF THE INVENTION

Helicopters are versatile aircraft in that they are capable of vertical lift and forward propulsion without the need of a runway, unlike most other passenger and cargo transporting style aircraft, such as propeller style airplanes and jet aircraft with a main fixed aircraft lifting wing. Unfortunately, helicopters do have disadvantages that are not generally associated with the other passenger and cargo transporting style aircraft.

One main disadvantage of a helicopter is a limited forward speed. The forward speed is limited due to a limit in available power to satisfy the significantly increasing power demands or requirements needed as forward airspeed increases. One factor that contributes to the large increase in power requirements is referred to as a "retreating blade stall." During forward flight of the helicopter a section of a helicopter rotor, that is rotating in a rearward direction opposite a flight direction of the helicopter, experiences reversed flow with airspeed that is faster than rotational speed of the rotor. Since the airspeed is faster than the rotational speed of the rotor the rotor begins to "stall", in the stated section, and results in a large increase in rotor drag and therefore increased power is required.

Another main contributor to the large increase in power required with increasing airspeed is referred to as an "advancing tip Mach number problem". This is a result of a rotational velocity of a rotor tip, in a direction the helicopter is traveling, experiencing a combination of its rotational velocity in addition to the forward velocity of the helicopter. When the combination of the rotational velocity and the forward velocity exceed a drag divergence Mach number of a corresponding airfoil of the rotor, a large increase in drag is experienced.

The retreating blade stall and the advancing tip Mach number factors are additive and impact power required by the rotor in approximately the same helicopter forward speed regime. These two factors in combination with other lesser contributing factors known in the art, result in limiting forward speed of a helicopter to a speed which is less than a forward speed that is attainable by conventional fixed wing aircraft.

In order to have vertical takeoff and landing capability of a helicopter and to have forward flight speed ability of other aircraft, different styles of vertical takeoff and landing (VTOL) aircraft are being introduced and are becoming more abundant. Generally, dual flight mode VTOL aircraft takeoff as a helicopter with one or more rotating rotors provide lift in a vertical direction.

One style of VTOL that is utilized to overcome the forward speed limitation of traditional VTOL aircraft and to provide increased performance including increased cargo carrying capabilities and increased center of gravity travel capability is a dual rotor ("tandem rotor") canard rotor/wing design. This canard rotor/wing design includes a pair of wings that operate in a helicopter mode and in a fixed wing mode. Each wing includes two blades that are typically symmetrical and that operate irrespective of flow direction. The canard rotor/wing design provides increased forward speed compared to other types of rotorcraft. The canard rotor/wing design also can provide greater center of gravity travel capability, than single-rotored versions of canard rotor wing aircraft, which allows for greater cargo carrying capability.

The tandem canard rotor/wings may laterally overlap each other, due to their required length and mounting locations. In order to prevent a collision between the rotor/wings the rotor/wings are vertically mounted in an offset configuration such that a first rotor/wing is vertically positioned below a second rotor/wing. However, due to the flex in the rotor/wings a collision situation can still arise between the rotor/wings. To further prevent a collision, mechanical devices may be utilized as they are on tandem-rotor helicopters to maintain synchronization between the rotor/wings such that the blades from the front rotor never lie directly below those from the rear rotor; a nominal 90 degrees of separation is desired, to minimize any possibility of blade-to-blade collisions. These mechanical devices, such as shafts and linkages as used on tandem-rotor helicopters, can be heavy, long, and consume a significant amount of space on an aircraft. The stated mechanical devices are also often exposed to combat damage that can cause loss of rotor synchronization and consequent loss of the aircraft due to blade collisions. As known in the art, it is also generally desirable to minimize the weight of aircraft systems and components to allow for increased carrying capability.

It is therefore, desirable to provide a VTOL aircraft that prevents a collision between rotors without using mechanical positioning systems and that has increased performance including increased cargo carrying capabilities.

SUMMARY OF THE INVENTION

The present invention provides a rotational position-adjusting system for a vertical takeoff and landing aircraft. The system includes multiple detectors that generate rotor position signals. The rotor signals are indicative of the position of each rotor of the aircraft. The rotors provide lift to the aircraft. A controller is coupled to the detectors and adjusts the rotational speed of one or more of the rotors in response to the rotor signals.

The embodiments of the present invention provide several advantages. One such advantage is the provision of determining the relative rotational position of two or more rotors of an aircraft and adjusting that relative position to prevent a collision therebetween.

Another advantage provided by an embodiment of the present invention is the provision of performing the above stated advantage through the use of electronic control rather than mechanical control. This minimizes the weight of a rotor relative speed adjustment system, which increases the cargo carrying capability of VTOL aircraft.

Furthermore, the present invention also provides a simple, inexpensive, and compact system and technique for performing rotational speed adjustment of rotors and tandem rotor/wings that may be utilized in illuminated and non-illuminated conditions.

The present invention itself, together with further objects and attendant advantages, will be best understood by reference to the following detailed description, taken in conjunction with the accompanying drawing.

BRIEF DESCRIPTION OF THE DRAWINGS

FIG. 1 is a side view of a vertical takeoff and landing (VTOL) aircraft utilizing a rotor rotational position-adjusting system in accordance with an embodiment of the present invention;

FIG. 2 is a side view of a VTOL aircraft utilizing a rotor rotational position-adjusting system in accordance with another embodiment of the present invention.

DETAILED DESCRIPTION

Figure 3:
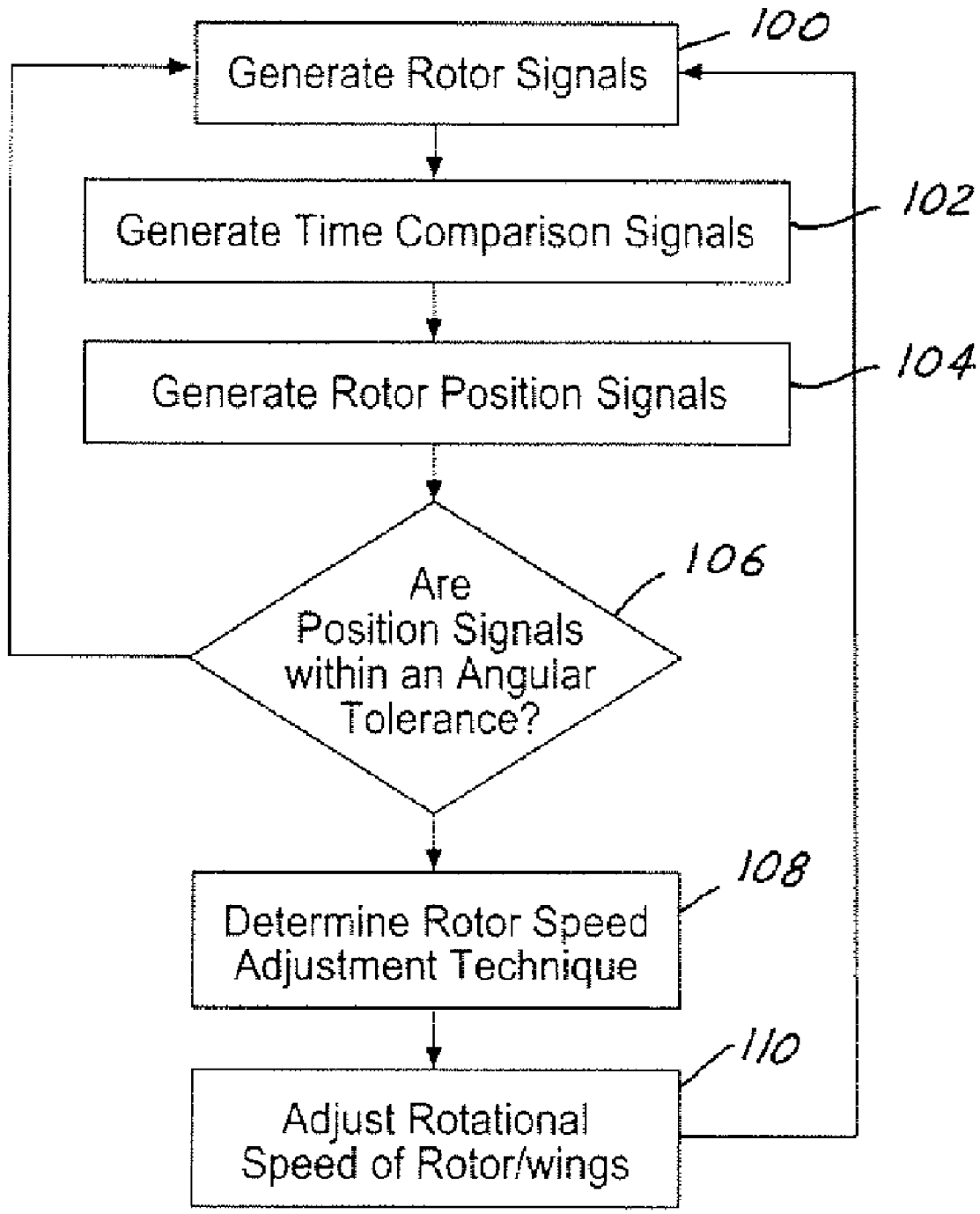
FIG. 3 is a logic flow diagram illustrating a method of operating a VTOL aircraft having a rotor rotational position-adjusting system in accordance with another embodiment of the present invention.

In each of the following Figures, the same reference numerals are used to refer to the same components. While the present invention is described with respect to a system for controlling the rotational position of tandem rotor wings or dual rotors of a rotorcraft, the present invention may be adapted for various applications and systems known in the art.

In the following description, various operating parameters and components are described for one constructed embodiment. These specific parameters and components are included as examples and are not meant to be limiting.

Referring now to FIGS. 1 and 2, side views of vertical takeoff and landing (VTOL) aircraft 4 and 4' utilizing rotor rotational position-adjusting systems 6 and 6' in accordance with an embodiment of the present invention is shown. The rotational position-adjusting systems 6 and 6' are used to monitor and maintain appropriate rotational positioning of each of the tandem rotor/wings 8 in relation to each other. A synchronized separation tolerance is maintained between the tandem rotor wings 8, which is described in further detail below. The maintenance of the tandem rotor/wing positions prevents interference and collisions therebetween. Although the present invention is primarily described with respect to the shown tandem rotor/wing configurations and aircraft of FIGS. 1 and 2, the present invention may be applied to other rotor or rotor/wing configurations and to other aircraft, such as helicopters and other vertical takeoff and landing aircraft.

The aircraft 4 and 4' include fuselages 10 and 10', multiple rotor/wing hub assemblies 12 including the multiple tandem rotor/wings 8, and transitional lift wings 16. The fuselages 10 and 10' are capable of carrying large loads that may be loaded through rear cargo doors 18. The rotor/wings 8 are mechanically coupled to the fuselages 10 via hubs 20, which are rotated by drive systems 21. The drive systems 21 include one or more turbofan engines 22 that each have engine nozzles 23. The rotor/wings 8 propel and provide lift for the aircraft 4 and 4'. The rotor/wings 8 operate in dual modes including a vertical lift mode and a fixed wing mode, in conjunction with the engines 22, to provide takeoff, landing, and lower speed flight and hover capabilities of a helicopter and forward high speed thrust and lift capabilities of a fixed wing aircraft, such as a jet aircraft. As the rotor/wings 8 are transitioned from the vertical lift mode to the fixed wing mode the transitional lift wings 16 provide lift to the aircraft 4 and 4'. Main controllers 24 are coupled to the rotor/wings 8 and switch between the vertical lift mode and the fixed wing mode. Although, two tandem rotor/wings and a single transitional fixed wing are shown for each of the aircraft 4 and 4' additional rotor/wings and fixed wings may be incorporated.

In an example embodiment of the present invention, a first tandem rotor/wing 30 is located in a forward portion 32 of the aircraft 4 and 4' and a second tandem rotor/wing 34 is located behind the first rotor/wing 30 and in a rearward portion 36 of the aircraft 4 and 4', as shown. The first rotor/wing 30 is vertically in a lower location relative to the second rotor/wing 34 to avoid interference during a vertical lift mode. The transitional lift wings 16 are located between the first rotor/wing 30 and the second rotor/wing 34 on the fuselages 10 and 10'. The transitional lift wings 16 are vertically in a lower location relative to both the first rotor/wing 30 and the second rotor/wing 34 to provide central lift of the aircraft 4 and 4' and to also avoid interference with the rotor/wings 30 and 34.

The rotor/wings 8 include multiple blades 40 that have one or more flow ducts 42 extending therethrough and serve as an exhaust transport between the engines 22 and the exit nozzles 44 during the vertical lift mode. Exhaust gases 45 from the engines 22 are combined and distributed to the flow ducts 42. The exhaust gases from the engines 22 flow to both the first rotor/wing 30 and the second rotor wing 34. The first rotor/wing 30 receives the exhaust gases 45 via a transport duct 49 extending between the rotor/wings 8 along the fuselages 10 and 10'. Although, the transport duct 49 is shown as extending through a middle portion 51 of the fuselages 10 and 10', the transport duct 49 may be in other locations within the aircraft 4 and 4'. The flow ducts 42 are closed during the fixed wing mode and exhaust gases 45 are diverted from entering the rotor/wings 8, via exhaust duct valves 46. A mast valve (not shown) may be utilized to divert the exhaust gases 45 from entering the rotor/wings 8. The exhaust gases 45 are then directed to the engine nozzles 23 instead of the exit nozzles 44. Exit nozzle valves (not shown) may also be used near the exit nozzles 44, to adjust, prevent the flow of, or divert the exhaust gases 45.

The rotor/wings 8 and the transitional lift wings 16 may have a leading or trailing edge device such as a flap, a slat, a flaperon, an aileron, a split aileron or other leading or trailing edge device, known in the art, to provide control forces and moments during flight.

Although, the engines 22 are located in a rearward portion 36 of the aircraft 4 and 4', below the second rotor/wing 34, they may be located in other locations on the aircraft 4 and 4'. For example, the engines 22 may be located between the first rotor/wing 30 and the second rotor/wing 34 above the transitional lift wings 16. Also, the turbofan engines 22 are for example purposes only; other engines known in the art may be utilized.

In operation, the main controllers 24 are utilized to switch the rotor/wings 8 between a vertical lift mode and a fixed wing mode. During vertical lift mode the rotor/wings 8 are free to rotate similar to a helicopter. Exhaust gases 45 are allowed to flow from the engines 22 through the blades 40 and exit the nozzles 44 as to rotate the blades 40.

The main controllers 24 may switch the aircraft 4 and 4' from operating in the vertical lift mode to operating in the fixed wing mode. The main controllers 24 begin off-loading lift of the rotor/wings 8, thus reducing rotational speed of the rotor/wings 8, as the fixed wing 16 develops lift when forward flight speed increases. The valves 46 are gradually closed to prevent exhaust gases 45 from entering the ducts 42 and the exhaust gases 45 are redirected to exit engine nozzles 23, to generate forward thrust. As the main controllers 24 are off-loading lift of the rotor/wings 8, the transitional lift wings 16 are enabling lift on the fuselages 10 and 10'. When the rotor/wings 8 have come to a stop, the rotor/wings 8 are fixed to the fuselages 10 and 10'.

When operating in the fixed wing mode the main controllers 24 may transition back to the vertical lift mode. The exhaust gases 45 are again allowed to flow from the engines 22 through the blades 40 to rotate the rotor/wings 8.

The main controllers 24 may be microprocessor based such as a computer having a central processing unit, memory (RAM and/or ROM), and associated input and output buses. The main controllers 24 may be a portion of a central vehicle main control unit, an interactive vehicle dynamics module, a main safety controller, or be a stand-alone controller as shown. Note that the main controllers may each be divided into multiple controllers. Certain designated controllers may be utilized to perform the tasks described above and others may be utilized to perform tasks described below.

The rotor position-adjusting systems 6 and 6' include multiple detectors 60 and one or more position-adjusting systems or devices 62, which are coupled to the main controllers 24. The detectors 60 are utilized to detect the rotational position of the rotor/wings 8. The main controllers 24 compare position information gathered from the detectors 60 and adjust the rotational speed of the rotor/wings 8 via the position-adjusting devices 62.

The detectors 60 detect emissive energy, such as in the form of infrared energy, light, or ultraviolet energy, which is indicative of the relative position of the rotor/wings 8. The detectors 60 may be used to detect, for example, infrared fluctuations due to the passage of the rotor/wings 8, of the fuselages 10 and 10' or portions or components thereof, or may be used to detect emissive energy generated from emitters 64, which is described in further detail below.

The detectors 60 may be of various types and styles known in the art. The detectors 60 may be in the form of infrared or ultraviolet detectors, such as phototransistors, photodiodes, electrooptical sensors, or ultraviolet spectrometers, and may be sensitive to one or a multiple number of spectral energy bands as an aid to positive signal detection and rejection of false energy sources not associated with the rotor position. The detectors 60 may be mounted on the fuselages 10 and 10' and on the rotor/wings 8, as shown, or on the hub assemblies 12, or elsewhere on the aircraft 4 and 4'.

The emitters 64 may be utilized in conjunction with the detectors 60. The emitters 64 generate illumination beams, represented by arrows 65, which are detected by the detectors 60. The emitters 64 may also be of various types and styles and be mounted in various locations on the aircraft 4 and 4'. The emitters 64 may be in the form of infrared emitters, ultraviolet emitters, or may be in some other form of emitter or illuminator known in the art. In the embodiment of FIG. 1, a first emitter 66 is mounted on the fuselage 10 and is directed at a first detector 68 mounted on the first rotor/wing 30. A second emitter 70 is mounted on the second rotor/wing 34 and is directed at a second detector 72 that is mounted on the fuselage 10. In the embodiment of FIG. 2, both the emitters 74 and the detectors 76 are mounted on the fuselage 10' and are directed upwards at the rotor/wings 30 and 34. Reflective devices 78, such as mirrors or reflective materials, are attached to the bottom side 80 of the rotor/wings 30 and 34 and are used to reflect emissive energy generated from the emitters 74 back to the detectors 76. In addition to or as an alternative, the exterior materials of the rotor/wings 8 may reflect light or emissive energy generated from the emitters 74.

Although a particular number of detectors, emitters, and reflective devices are shown in FIGS. 1 and 2, any number of each may be utilized. The detectors, emitters, and reflective devices may be in various configurations and patterns.

The position-adjusting devices 62 include the drive systems 21 having the engines 22, the ductwork 42 and 49, and the valves 46. The drive systems 21 may be utilized to increase or decrease the rotational speed of the rotor/wings 8 by modulating the amount of gas delivered to the reaction drive nozzle(s) of the rotor/wings 8. The position-adjusting devices 62 may also include brakes 82, coupled to the hub assemblies 12, for quick rotational speed reduction of the rotor/wings 8. The position-adjusting devices 62 may further include drag devices 84, such as flaps, slats, flaperons, ailerons, split ailerons, spoilers, drag plates, and other drag devices known in the art. Although the drag devices 84 are only shown on the second rotor/wings 34, they may be utilized on any of the rotor/wings 8.

Referring now to FIG. 3, a logic flow diagram illustrating a method of operating a vertical takeoff and landing (VTOL) aircraft having a rotor rotational position-adjusting system is shown in accordance with another embodiment of the present invention. The method of FIG. 3 for simplicity is described primarily with respect to the embodiment of FIG. 1, but may be easily modified to apply to other embodiments of the present invention.

In step 100, the detectors 60 generate rotor signals indicative of the positions of the rotor/wings 8. The detectors 60, as inferred above, may generate the rotor signals in response to the emissive energy directed or reflected from the emitters 64, or directly from the rotor/wings 8 or fuselage 10 or a component thereof. The detectors 60 may monitor the fluctuation in the received emissive energy as each rotor/wing 8 passes through illumination beams 65 generated by the emitters 64. As each rotor/wing blade 40 passes through the illumination beams 65 the detectors may send a rotor signal to the main controller 24.

In step 102, the main controllers 24 may compare the passage of time between the detection of each of the rotor/wing blades 40, on the forward rotor/wing 30, with the passage of time between the detection of each of the rotor/wing blades 40, on the rearward rotor/wing 34. The difference between the passage of time between forward blades and the passage of time between rearward blades is used to generate time comparison signals and derive absolute blade positions.

In step 104, the main controller 24 determines the positions of the rotor/wings 8 relative to each other and generates position signals indicative of such positions in response to the time comparison signals. In step 106, the main controller 24 compares the position signals with an angular tolerance to generate rotor adjustment signals. When the position signals are not within the specified angular tolerance the speed of one or more of the rotor/wings 8 is adjusted, otherwise the main controller 24 returns to step 100. As an example, the speed of the rotor/wings 8 may be increased or decreased using the rotor drive system 21 and/or the rotor blades 40.

In step 108, the main controller 24 determines rotor speed adjustment techniques to utilize in response to the rotor adjustment signals. In one embodiment of the present invention, when the rotor adjustment signals are less than one or more predetermined values the gas flow to the rotor/wings 8 is adjusted. When the rotor adjustment signals are greater than or equal to one or more of the predetermined values rotor brake pressures are adjusted utilizing the brakes 82. The gas flow to the rotor/wings 8 is generally adjusted for smaller rotational speed adjustments and for increases in rotational speed. The rotor brake pressure is generally adjusted for larger rotational speed adjustments. The main controller 24 may also decrease or adjust the rotational speed of the rotor/wings 8 utilizing one or more of the drag devices 84 mentioned above. Of course, more than one rotor speed adjustment technique may be utilized simultaneously.

In step 110, the main controller 24 adjusts the rotational speed of one or more of the rotor/wings 8 using the determined adjustment technique of step 108 to maintain a synchronized separation tolerance. The separation tolerance may be the same as or used in addition to the angular tolerance. The rotational speeds of the rotor/wings 8 are adjusted in response to the rotor adjustment signals. The rotational speed of the first rotor/wing 30 is adjusted relative to the rotational speed of the second rotor/wing 34, and vice versa. Steps 100-110 are repeated such that the rotational speeds of the rotor/wings 8 are adjusted until the relative positions of the rotor/wings 8 are within the angular tolerance.

When a small rotational speed adjustment is performed the main controller 24 signals the valves to incrementally reduce or increase gas flow to the rotor/wings 8, thus decreasing or increasing speed of the appropriate rotor/wing. When a larger rotational speed reduction is desired the main controller 24 increases or adjusts the braking pressure of the brakes 82 to decrease rotational speed of the rotor/wings 8.

The above-described steps, are meant to be an illustrative example, the steps may be performed synchronously, continuously, or in a different order depending upon the application.

The present invention provides a rotor position-adjusting system, which maintains the relative position between rotors of an aircraft to prevent collision therebetween. The rotor position-adjusting system provides a lightweight, compact, and inexpensive design for accurate and efficient monitoring and adjusting of the speed and position of aircraft rotor blades.

The above-described apparatus and method, to one skilled in the art, is capable of being adapted for various applications and systems known in the art. The above-described invention can also be varied without deviating from the true scope of the invention.

What is claimed is:

1. A rotor rotational position-adjusting system for a vertical takeoff and landing aircraft comprising:
   a first detector that generates rotor signals when a blade of a first rotor of the aircraft passes through a first rotational position;
   a second detector that generates rotor signals when a blade of a second rotor of the aircraft passes through a second rotational position; and
   a controller coupled to said first and second detectors to receive said rotor signals, wherein said controller is programmed to determine the relative rotational position of said first and second rotors as a function of said rotor signals, compare said relative rotational position of said first and second rotors with a specified angular tolerance, and adjust a rotational speed of said first rotor in relation to said second rotor in response to said comparison showing that said relative rotational position of said first and second rotors is outside said specified angular tolerance.

2. A vertical takeoff and landing aircraft comprising:
   an aircraft fuselage;
   first and second hubs mechanically coupled to said fuselage;
   first and second drive systems for respectively driving said first and second hubs to rotate;
   first and second rotors mechanically coupled to said first and second hubs respectively;
   first and second emitters mounted to said fuselage or mounted to a blade of said first rotor and a blade of said second rotor respectively;
   a first detector that generates rotor signals in response to emissive energy from said first emitter when said blade of said first rotor passes through a first rotational position;
   a second detector that generates rotor signals in response to emissive energy from said second emitter when said blade of said second rotor passes through a second rotational position; and
   a controller coupled to said first and second detectors to receive said rotor signals, wherein said controller is programmed to determine the relative rotational position of said first and second rotors as a function of said rotor signals, compare said relative rotational position of said first and second rotors with a specified angular tolerance, and adjust a rotational speed of said first rotor in relation to said second rotor in response to said comparison showing that said relative rotational position of said first and second rotors is outside said specified angular tolerance and does not adjust a rotational speed of said first rotor in response to said comparison showing that said relative rotational position of said first and second rotors is within said specified angular tolerance.

3. A vertical takeoff and landing aircraft comprising:
   an aircraft fuselage;
   first and second hubs mechanically coupled to said fuselage;
   first and second drive systems for respectively driving said first and second hubs to rotate;
   first and second rotors mechanically coupled to said first and second hubs respectively;
   a first detector that generates rotor signals when a blade of said first rotor passes through a first rotational position;
   a second detector that generates rotor signals when a blade of said second rotor passes through a second rotational position; and
   a controller coupled to said first and second detectors to receive said rotor signals, wherein said controller is programmed to determine the relative rotational position of said first and second rotors as a function of said rotor signals, compare said relative rotational position of said first and second rotors with a specified angular tolerance, and a rotational speed of said first rotor in relation to said second rotor in response to said comparison showing that said relative rotational position of said first and second rotors is outside said specified angular tolerance.

4. A vertical takeoff and landing aircraft as in claim 3 wherein said first and second detectors are coupled to said aircraft fuselage and are directed towards said first and second rotors respectively.

5. A vertical takeoff and landing aircraft as in claim 3 wherein said first and second detectors are coupled to said first and second rotors respectively and are directed towards said aircraft fuselage.

6. A vertical takeoff and landing aircraft as in claim 3 wherein said first and second detectors detect infrared energy of said first and second rotors respectively.

7. A vertical takeoff and landing aircraft as in claim 3 wherein said first and second detectors detect ultraviolet energy of said first and second rotors respectively.

8. A vertical takeoff and landing aircraft as in claim 3 wherein said first and second detectors detect infrared energy of at least a portion of said aircraft fuselage.

9. A vertical takeoff and landing aircraft as in claim 3 wherein said first and second detectors detect ultraviolet energy of at least a portion of said aircraft fuselage.

10. A vertical takeoff and landing aircraft as in claim 3 wherein said controller adjusts the rotational speed of said first rotor by adjusting gas flow to said first rotor.

11. A vertical takeoff and landing aircraft as in claim 3 further comprising at least one gas control valve, said controller adjusting the rotational speed of said via control of said at least one gas control valve.

12. A vertical takeoff and landing aircraft as in claim 3 further comprising at least one brake, said controller adjusting the rotational speed of said via control of said at least one brake.

13. A vertical takeoff and landing aircraft as in claim 3 further comprising at least one drag device, said controller adjusting the rotational speed of said via control of said at least one drag device.

14. A vertical takeoff and landing aircraft as in claim 13 wherein said at least one drag device is selected from a group consisting of a flap, a slat, a flaperon, an aileron, a spoiler, a drag plate, and a split aileron.

15. A vertical takeoff and landing aircraft as in claim 3 wherein said controller switches said first and second rotors between a vertical lift mode and a fixed wing mode.

16. A vertical takeoff and landing aircraft as in claim 3 wherein said first and second rotors are tandem rotor/wings.

17. A vertical takeoff and landing aircraft as in claim 3 further comprising first and second emitters, said first and second detectors generating said rotor signals in response to emitted energy from said first and second emitters respectively.

18. A vertical takeoff and landing aircraft as in claim 17 wherein said first emitter is an infrared emitter or an ultraviolet emitter.

19. A vertical takeoff and landing aircraft as in claim 17 wherein:
   said first detector generates a first rotational position signal indicative of a first position of said first rotor in response to emitted energy from said first emitter; and
   said second detector generates a second rotational position signal indicative of a second position of said second rotor in response to emitted energy from said second emitter.

20. A vertical takeoff and landing aircraft as in claim 3 further comprising a plurality of emitters, said plurality of detectors generating said rotor signals in response to reflected energy generated from said plurality of emitters.

21. A vertical takeoff and landing aircraft as in claim 20 further comprising at least one reflective device reflecting energy emitted from said plurality of emitters towards said plurality of detectors.

22. A vertical takeoff and landing aircraft as in claim 20 wherein said plurality of emitters and said plurality of detectors are coupled to said aircraft fuselage.

23. A vertical takeoff and landing aircraft as in claim 20 wherein said plurality of emitters and said plurality of detectors are coupled to said plurality of rotors.

* * * * *